United States Patent
Agurs

(10) Patent No.: US 8,134,470 B2
(45) Date of Patent: Mar. 13, 2012

(54) HAZARD DETECTION SYSTEM

(76) Inventor: Milton L. Agurs, Washington, DC (US)

( * ) Notice: Subject to any disclaimer, the term of this patent is extended or adjusted under 35 U.S.C. 154(b) by 438 days.

(21) Appl. No.: 12/542,297

(22) Filed: Aug. 17, 2009

(65) Prior Publication Data

US 2010/0039273 A1 Feb. 18, 2010

Related U.S. Application Data

(60) Provisional application No. 61/089,197, filed on Aug. 15, 2008.

(51) Int. Cl.
*G08B 17/10* (2006.01)

(52) U.S. Cl. ............... 340/628; 340/632; 340/539.11; 340/539.26; 320/115

(58) Field of Classification Search ............ 340/628, 340/632, 539.1, 539.11, 539.14, 539.15, 340/539.13, 539.21, 539.26, 7.55; 455/414.1, 455/414.2, 410; 320/101, 103, 114, 115
See application file for complete search history.

(56) References Cited

U.S. PATENT DOCUMENTS

| | | | |
|---|---|---|---|
| 4,305,069 A | | 12/1981 | Machen |
| 4,464,651 A | * | 8/1984 | Duhame ............... 340/521 |
| 5,479,486 A | * | 12/1995 | Saji ..................... 455/573 |
| 6,633,231 B1 | * | 10/2003 | Okamoto et al. ...... 340/539.11 |
| 6,879,254 B1 | * | 4/2005 | Graham .............. 340/539.32 |
| 7,378,954 B2 | * | 5/2008 | Wendt ................ 340/539.11 |
| 2006/0007151 A1 | | 1/2006 | Ram |

* cited by examiner

*Primary Examiner* — Anh V La
(74) *Attorney, Agent, or Firm* — Michael L. Greenberg, Esq.; Greenberg & Lieberman, LLC

(57) ABSTRACT

A remote control system relating to a remote control and a base charger. A rechargeable battery contained within the remote control is charged when rested within a charging position of the base charger. Once a user removes the remote control from the charging position, the remote control doubles as a portable hazard detector that operates in a sustained manner for as long as the rechargeable batter has power. This means that the remote control will emit an alert noise if a hazard such as smoke or high level of carbon monoxide is detected by internal sensors located within the remote control. The base charger also has sensors and an alert speaker to inform the user of a potential hazard. In addition, the base charger is in communication with the remote control so that a user can locate a missing remote control.

13 Claims, 3 Drawing Sheets

HAZARD DETECTION SYSTEM

This is a non-provisional application claiming priority to provisional patent application No. 61/089,197 filed on Aug. 15, 2008.

FIELD OF THE INVENTION

The present invention is a hazard detection system relating to a base charger and a remote control for such household items as televisions or music players. The base charger is such that when the remote control is removed from its charging position, an activation mechanism automatically begins sensing for smoke and carbon monoxide. A locator button on the base charger also can be compressed in order to activate an alert on a receiver located on the remote control so the user can ultimately follow the sound of the alert to locate the remote control.

BACKGROUND OF THE INVENTION

Some of the most important and also most neglected items inside a home are the hazard detectors for such items as smoke and carbon monoxide. It is very common for people to forget to change the batteries. In addition, detectors that are hard-wired to the electrical system of a home also can be rendered worthless when the power goes out and the user neglects to change the battery backup. This poses an obvious danger for those rare occasions when a fire or dangerous level of carbon monoxide exists in a home. In this regard, there is a need for a system that employs a rechargeable battery to a hazard detector that is incorporated with a portable household device such as a remote control.

Meanwhile, one item that is important to people is their entertainment. This includes remote controls that are typically used everyday. For example, people often fall asleep with the remote control nearby. At the same time, the home smoke or carbon monoxide detectors may not have battery power or the hard wiring may have long ago failed. In fact, statistics by the National Fire Protection Association state that 75-80 percent of all fire-related deaths occur within the home. More than half of these deaths occur in buildings without a functioning smoke detector. At the same time, carbon monoxide poisoning often is confused with the flu based on the symptoms. This can render a person unconscious to the point of death. Because of these facts, there remains a need for a system that offers the most comprehensive assurance that a hazard detector will be functional and located within common living areas of a home such as a bedroom or living room. The present invention solves this need based on the fact that the battery power of a remote control is likely to be tested every day through its common usage. This means that the hazard detector is much more apt to be powered and fully functional.

At the same time, there also is a need for a system that easily permits a user to locate a remote control when it becomes missing. This is an issue that has affected most people at one time or another and in fact can be very frustrating. Because of this, there is a need for a system that permits a user to push a locator button on a stationary item in order to cause the remote control to identify itself. The present invention solves this issue as well by incorporating a locator button with the base charger. When the locator button is compressed, the remote control speaker will emit a noise and the buttons on the remote control will blink so that the user can easily locate the missing remote control. This location aspect is combined with the alert aspects of the present invention relating to the hazard detector.

U.S. Pat. No. 4,305,069 issued to Machen on Dec. 8, 1981 is a battery powered portable smoke and fire detector and portable battery charger. Unlike the present invention, this detector is a separate device and not incorporated into one that is already commonly used. Moreover, unlike the present invention, there is no system in Machen to locate the detector when it is undiscoverable to the user. Thus, Machen requires the user to remember to incorporate an additional device into his or her daily use. Meanwhile, the present invention adds functionality to a commonly used device that is unlikely to be forgotten or neglected and a mechanism to find the device when it is undiscoverable to the user.

US 2006/0007151 A1 filed by Ram on Jun. 8, 2005 are additional devices, disposed within the enclosure of peripheral computer apparatus. While the list of additional devices included in Ram includes smoke detectors, unlike the present invention, Ram explicitly incorporates additional devices or functionality only within peripheral computer apparatus. Moreover, unlike the present invention, no peripheral computer apparatus remains in the user's possession to the extent of a remote control. Additionally, there is no system in Ram to locate the detector when it is undiscoverable to the user. Thus, while Ram limits the addition of a smoke detector only to peripheral computer apparatus, which are fundamentally different from remote controls in terms of their portability and use, the present invention incorporates multiple hazard detectors into a remote control, and includes a mechanism to find the device when it is undiscoverable to the user.

SUMMARY OF THE PRESENT INVENTION

The present invention is a remote control system. The remote control is placed into the charging position of a base charger. When the remote control is rested within the charging position, the rechargeable battery located inside the remote control begins charging. A user may then remove the remote control from the charging position of the base charger. When the remote control is removed, a circuit located within the base charger is closed. This causes the sensors located within the base charger to immediately and automatically scan for evidence of such hazards as smoke and carbon monoxide.

The remote control is operated via conventional means in terms of its interaction with corresponding electronic equipment such as televisions and music players. A receiver is located within the remote control and is in communication with an alert speaker. When a user compresses a locator button located on the base charger, a circuit is closed and a signal is transmitted to the receiver located within the remote control. Once the receiver senses the signal from the base charger, the alert speaker will emit a noise. In this manner, a user will hear the noise and can easily locate the remote control.

Meanwhile, a base charger alert speaker operates in communication with the sensors located on the base charger. When the remote control is removed, the circuit is closed so that the base charger alert speaker can communicate with the sensors. If the sensors detect a hazard such as smoke or dangerous level of carbon monoxide, the base charger alert speaker will emit an alert noise. In an additional embodiment of the present invention, the remote control also may have sensors to detect smoke or dangerous levels of carbon monoxide. In this manner, the remote control will emit an alert noise when detecting a danger such as smoke or dangerous level of carbon monoxide.

DETAILED DESCRIPTION OF THE PREFERRED EMBODIMENT

The present invention is a system for alerting a user about the existence of various dangers such as smoke and high levels of carbon monoxide in a sustainable manner while also permitting the user to always be able to locate a remote control (60).

Figure 1:
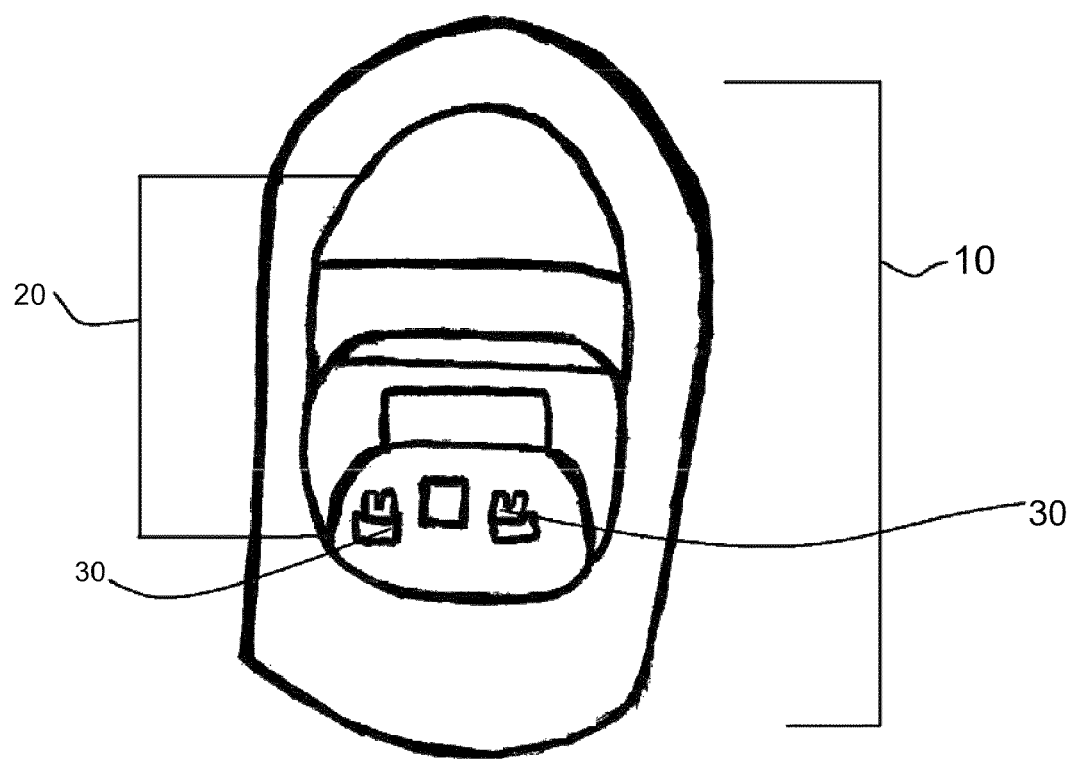
FIG. 1 is a view of the charging position of the base charger after a user has removed the remote control.

FIG. 1 offers a view of an embodiment of a base charger (10). A user may place the base charger (10) at virtually any location. The base charger (10) in the preferred embodiment has a conventional power source connection such that a user can plug the base charger (10) into a socket in order to receive power. As we see in FIG. 1, charging position (20) is formed into the base charger (10). This is so a user can place a remote control (60) into the charging position (20). Connection nodes (30) located within the charging position (20) are configured to match with counterpart connection nodes (70) positioned at the bottom end of the remote control (60). When the connection nodes (30) are connected with the counterpart connection nodes (70), power is transferred from the base charger (10) into the remote control (60). A rechargeable battery is placed within the interior of the remote control (60) such that the rechargeable battery receives the power that is transferred from the base charger (10) through the counterpart connection nodes (70). In this manner, power is stored within the remote control (60) via the rechargeable battery. Thus, the remote control (60) can operate for extended periods of time before needing to be placed back within the charging position (20) in order to receive more power for storage.

In other words, when the remote control (60) is rested within the charging position, (20) the rechargeable battery located inside the remote control (60) begins charging. A user may then remove the remote control (60) from the charging position (20) of the base charger (10). When the remote control (60) is removed, a circuit located within the base charger (10) is closed. This causes sensors located within the base charger (10) to immediately and automatically scan for evidence of such hazards as smoke and carbon monoxide. The sensors are conventional and are placed at strategic locations of the base charger (10) so that when evidence of hazard such as smoke or carbon monoxide reaches the sensors under conditions of a closed circuit, the sensor operates in conjunction with a speaker that ultimately emits an alert sound.

Figure 2:
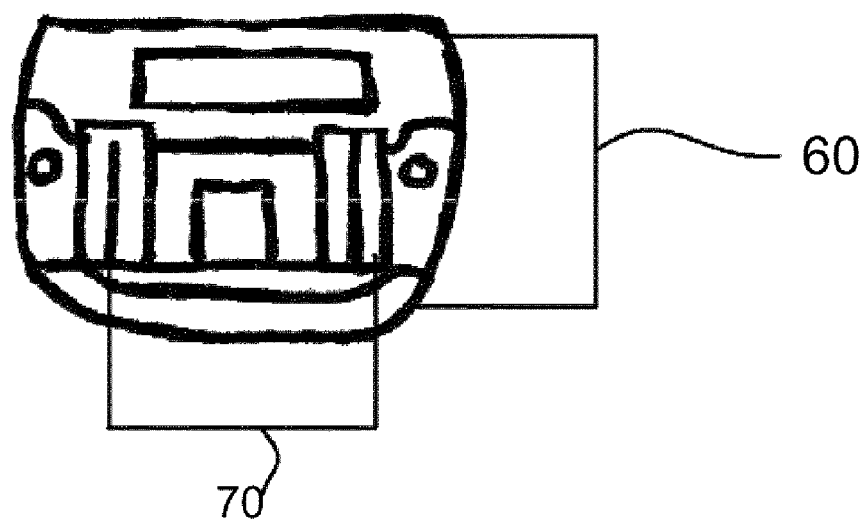
FIG. 2 is a view of the bottom portion of the remote control.

FIG. 2 is a view of the bottom portion of the remote control (60). The remote control (60) is operated via conventional means in terms of its interaction with corresponding electronic equipment such as televisions and music players. The remote control (60) also is formed with sensors placed at strategic locations. These sensors operate via conventional means to detect such hazards as smoke and high levels of carbon monoxide. The sensors located within the remote control (60) begin functioning when the remote control (60) is removed from the charging position (20). Once the remote control (60) is removed from the charging position (20) by the user, a circuit is closed within the remote control (60), which allows the sensors to begin detecting. If a hazard is detected by the sensors located within the remote control (60), a remote control speaker placed within the remote control (60) will emit an alert sound. The remote control speaker is activated via conventional means in regard to the connection between the remote control speaker and the sensors. All power functions relating to the remote control (60)—including communication with the electronic equipment, sensors and remote control speaker—receive power from the conventional rechargeable battery that is placed within the interior of the remote control (60).

Figure 3:
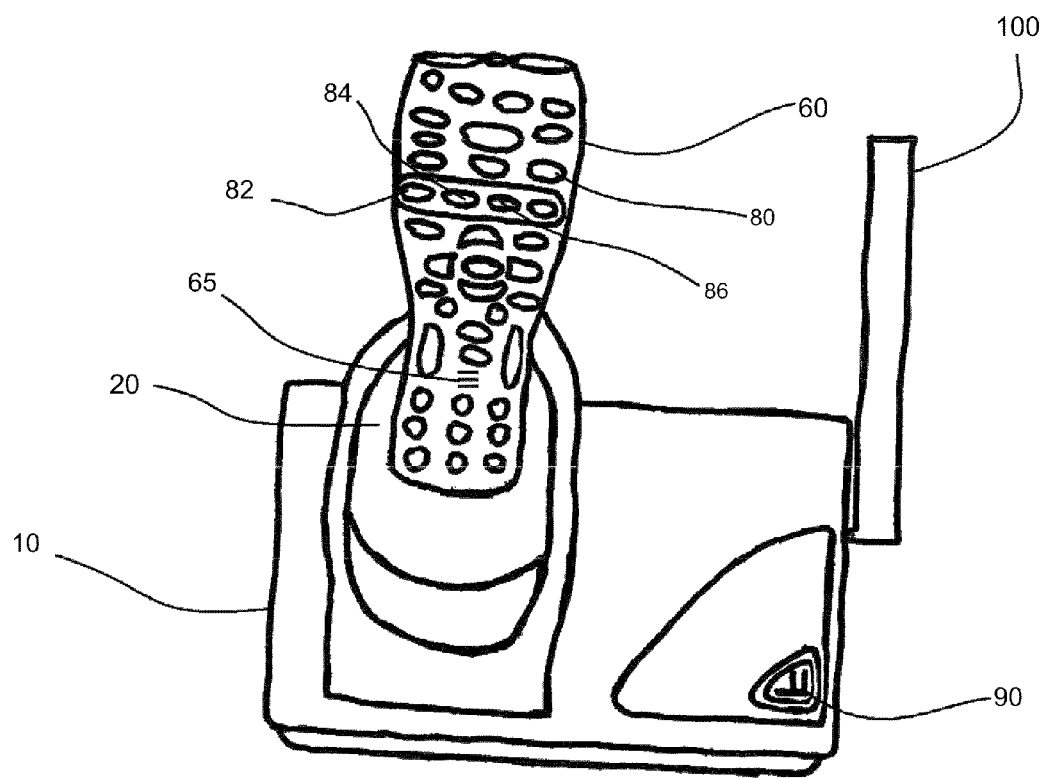
FIG. 3 is a view of the present invention when the remote control is placed into the charging position of the base charger.

When a hazard is detected by the sensors, the remote control speaker will emit an alert no matter where the remote control (60) is located (apart from the charging position (20). This means that the user can take the remote control anywhere he or she wants and use it as a portable hazard detector. For example, a user who has fallen asleep in a basement with a remote control (60) of the present invention nearby will be alerted to a fire or carbon monoxide event through the placement of the remote control (60). In addition, FIG. 3 shows an embodiment of the buttons (80) that are placed onto a remote control (60). In the preferred embodiment of the present invention, the buttons (80) will blink on and off when the remote control speaker is activated. The buttons (80) blink via conventional means such that a user will see the illuminated buttons (80) in the dark. An additional embodiment includes separate displays such as a carbon monoxide display (82), smoke display (84) and locator display (86) that illuminate only when triggered by the sensors or receiver in regard to the specific event. The illumination of the buttons (80) is powered by the rechargeable battery placed within the interior of the remote control (60).

The locator display (86) and receiver relates to the ability of the user to locate a missing remote control (60). The receiver is located within the remote control (60) and is in communication with the remote control speaker. When a user compresses a locator button (90) located on the base charger (10) as seen in FIG. 3, a circuit is closed and a signal is transmitted to the receiver located within the remote control (60). Once the receiver senses the signal from the base charger, the remote control speaker will emit a noise. In this manner, a user will hear the noise and can easily locate the remote control (60). In the preferred embodiment, the buttons (80) will blink or illuminate as well when the locator button (90) is compressed. The locator display (86) also will illuminate.

FIG. 3 depicts an embodiment of the present invention when the remote control (60) is rested within the charging position (20) of the base charger (10). In this view, an antenna (100) demonstrates a conventional embodiment of how the base charger (10) communicates with the remote control receiver when the locator button (90) is compressed.

Having illustrated the present invention, it should be understood that various adjustments and versions might be implemented without venturing away from the essence of the present invention. The present invention is not limited to the embodiments described above, and should be interpreted as any and all embodiments within the scope of the following claims.

I claim:
1. A hazard detection system, comprising:
placing a base charger in a location, the base charger receiving power via a plug;
forming a charging position into the base charger;

forming a remote control to fit into the charging position such that power is transferred from the base charger to the remote control;

storing power within a rechargeable battery contained within the remote control;

causing sensors located within the base charger to scan for evidence of hazards when the remote control is removed from the charging position;

causing sensors located within the remote control to scan for evidence of hazards when the remote control is removed from the charging position;

emitting an alert via a remote control speaker when a hazard is detected by the sensors located within the remote control when the remote control is not connected to the charging position; and causing a noise to be emitted from the remote control speaker when the remote control is not connected to the charging position and a button on the base charger is compressed, the button, when compressed, and the base charger in communication with a receiver located within the remote control.

2. The system of claim 1, further comprising emitting an alert via the base charger when a hazard is detected by the sensors located within the base charger.

3. The system of claim 2, further comprising emitting an alert via the base charger when a hazard is detected by the sensors located within the base charger when the remote control is not connected to the charging position.

4. The system of claim 1, further comprising matching connection nodes located within the charging position with connection nodes positioned at the bottom end of the remote control.

5. The system of claim 4, further comprising transferring power from the connection nodes located within the charging position with the connection nodes positioned at the bottom end of the remote control when the remote control is connected to the charging position.

6. The system of claim 1, further comprising closing a circuit located within the base charger when the remote control is removed from the charging position.

7. The system of claim 6, further comprising causing the sensors located within the base charger to immediately and automatically scan for evidence of hazards when the remote control is removed from the charging position.

8. The system of claim 1, further comprising detecting smoke and carbon monoxide via the sensors located within the remote control and the sensors located within the base charger.

9. The system of claim 1, further comprising closing a circuit located within the remote control when the remote control is removed from the charging position.

10. The system of claim 9, further comprising causing the sensors located within the remote control to immediately and automatically scan for evidence of hazards when the remote control is removed from the charging position.

11. The system of claim 1, further comprising placing buttons on the remote control that are configured to blink when the remote control speaker is activated.

12. The system of claim 1, further comprising illuminating displays located on the remote control, the displays illuminated when triggered by a specific event.

13. A hazard detection system, comprising:
a base charger configured to receive power via a socket and plug;
a charging position located within said base charger, said charging position having connection nodes;
a remote control having connection nodes, said remote control configured such that said connection nodes of said remote control connect with said connection nodes of said charging position;
a rechargeable battery located within said remote control, said rechargeable battery in communication with said connection nodes of said remote control;
sensors located within said remote control configured to scan for evidence of hazards when said remote control is not connected to said charging position;
sensors located within said base charger configured to scan for evidence of hazards when said remote control is not connected to said charging position; and
a speaker located within said remote control, said speaker in communication with said sensors.

* * * * *